US012759802B2

(12) United States Patent
Mroz et al.

(10) Patent No.: US 12,759,802 B2
(45) Date of Patent: Oct. 13, 2026

(54) CONVEYOR BELT MANAGEMENT SYSTEM AND METHOD

(71) Applicant: JBT Marel Corporation, Chicago, IL (US)

(72) Inventors: Cezary J. Mroz, Lewis Center, OH (US); Wyatt W. Wills, Newark, OH (US); Cameron Logan, Columbus, OH (US); Elton Brasil Da Costa, Columbus, OH (US)

(73) Assignee: JBT Marel Corporation, Chicago, IL (US)

( * ) Notice: Subject to any disclaimer, the term of this patent is extended or adjusted under 35 U.S.C. 154(b) by 270 days.

(21) Appl. No.: 18/742,615

(22) Filed: Jun. 13, 2024

(65) Prior Publication Data

US 2025/0382138 A1 Dec. 18, 2025

(51) Int. Cl.

| | |
|---|---|
| ***B65G 43/02*** | (2006.01) |
| ***B23Q 5/22*** | (2006.01) |
| *G06Q 30/0601* | (2023.01) |

(52) U.S. Cl.
CPC ............... *B65G 43/02* (2013.01); *B23Q 5/22* (2013.01); *B65G 2203/046* (2013.01); *G06Q 30/0633* (2013.01)

(58) Field of Classification Search
CPC .... B65G 43/02; B65G 2203/046; B23Q 5/22; G06Q 30/0633; G06Q 10/06315
See application file for complete search history.

(56) References Cited

U.S. PATENT DOCUMENTS

| | | | | |
|---|---|---|---|---|
| 5,490,590 | A * | 2/1996 | Courtney | B65G 43/00 198/502.1 |
| 8,127,918 | B2 * | 3/2012 | Warner | B65G 43/02 198/840 |
| 10,242,348 | B2 | 3/2019 | Sakuragi | |
| 10,617,126 | B2 | 4/2020 | Gasbarro | |
| 11,559,059 | B2 | 1/2023 | Wills et al. | |
| 2007/0222612 | A1 | 9/2007 | Krisl | |

(Continued)

FOREIGN PATENT DOCUMENTS

| | | |
|---|---|---|
| DE | 202 11 954 U1 | 1/2003 |
| EP | 0 175 483 A1 | 3/1986 |

*Primary Examiner* — Kyle O Logan
(74) *Attorney, Agent, or Firm* — Christensen O'Connor Johnson Kindness PLLC

(57) ABSTRACT

A conveyor belt management system for managing conveyor belt use for a workpiece processing machine may include a belt information system configured to obtain belt information from a data storage device of an endless conveyor belt and write belt information to the data storage device regarding belt usage, a processor, and a memory storing instructions that, when executed by the processor, cause a computing device of the conveyor belt management system to: process belt information including at least one of an endless conveyor belt type and belt usage and output a belt optimization plan. The belt optimization plan may include at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

20 Claims, 7 Drawing Sheets

(56) References Cited

U.S. PATENT DOCUMENTS

| | | | | |
|---|---|---|---|---|
| 2017/0137224 | A1 * | 5/2017 | Menke | B65G 43/08 |
| 2018/0157222 | A1 * | 6/2018 | Weatherbee | G05B 19/41865 |
| 2023/0002167 | A1 * | 1/2023 | Kleinikkink | B65G 43/02 |

* cited by examiner

CONVEYOR BELT MANAGEMENT SYSTEM AND METHOD

BACKGROUND

Conveyor belts are widely used to transport goods in processing lines, such as in food processing plants. In some instances, the correct conveyor belt design must be chosen for the intended processing application. Moreover, the chosen conveyor belt must be in sufficiently good condition to carry out the intended processing task. For instance, as a belt is used, an outer surface of the belt can become worn and may no longer be suitable for carrying out the task.

SUMMARY

In some aspects, the techniques described herein relate to a conveyor belt management system for managing conveyor belt use for a workpiece processing machine, including: a belt information system configured to obtain belt information from a data storage device of an endless conveyor belt and write belt information to the data storage device regarding belt usage; a processor; and a memory storing instructions that, when executed by the processor, cause a computing device of the conveyor belt management system to: process belt information including at least one of an endless conveyor belt type and belt usage; and output a belt optimization plan. The belt optimization plan may include at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

In some aspects, the techniques described herein relate to a conveyor belt management system, including: a workpiece processing machine, including: a processing station for processing workpieces; a conveyor system having an endless conveyor belt configured to support processing of the workpieces; and a belt information system configured for obtaining belt information from a data storage device of the endless conveyor belt and writing belt information to the data storage device regarding belt usage; and a processor; and a memory storing instructions that, when executed by the processor, cause a computing device of the conveyor belt management system to: process belt information including at least one of a belt type and belt usage; and output a belt optimization plan. The belt optimization plan may include at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

In some aspects, the techniques described herein relate to a method for managing conveyor belts for a workpiece processing machine, including: obtaining, with a belt information system, belt information from a data storage device of an endless conveyor belt; writing, with the belt information system, belt information to the data storage device regarding belt usage; processing, with a computing device, belt information including at least one of a belt type and belt usage; and outputting, with a computing device, a belt optimization plan. The belt optimization plan may include at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Systems and methods disclosed herein relate to conveyor belt tracking, conveyor belt management, and conveyor belt use optimization. Aspects of the disclosed systems and methods will be described with reference to a food processing machine that uses endless conveyor belts, such as a poultry skinner. However, it should be appreciated that the disclosed systems and methods may be used with any suitable machine using any type of conveyor belt.

The skin of poultry pieces or other types of meat is often removed prior to retail sales due to consumer demands. Automated skin removal machines have been developed for removing the skin from poultry pieces without the need to perform this task manually. In some machines, the skin is gripped and pulled away from or off of the underlying flesh as the poultry pieces are transported to a skinning station on an endless infeed conveyor, and then the skinned poultry pieces are transported away from the skinning station on an outfeed conveyor.

Figure 1:
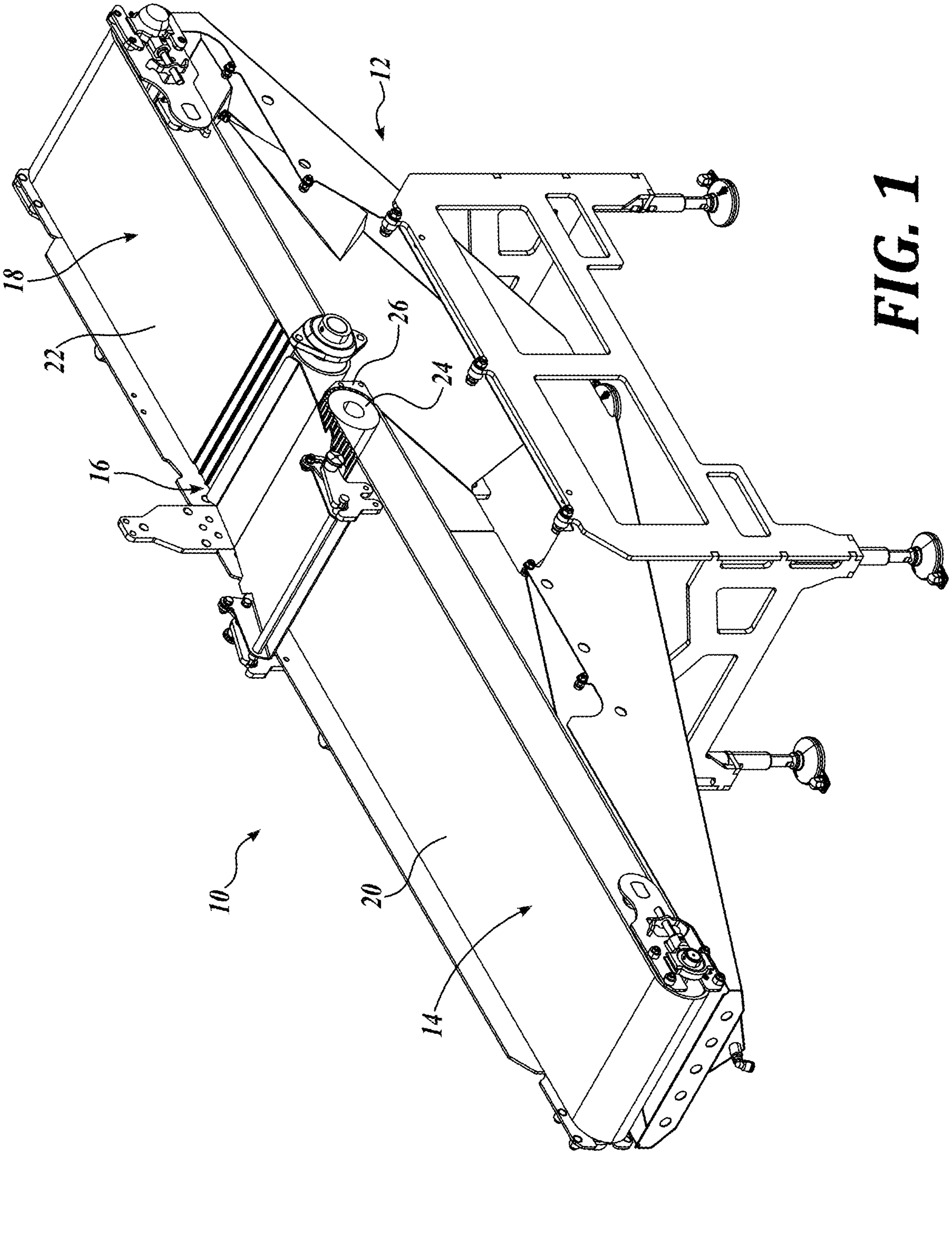
FIG. 1 is an isometric view of an exemplary automated skin removal machine having an infeed endless conveyor belt.
Figure 2:
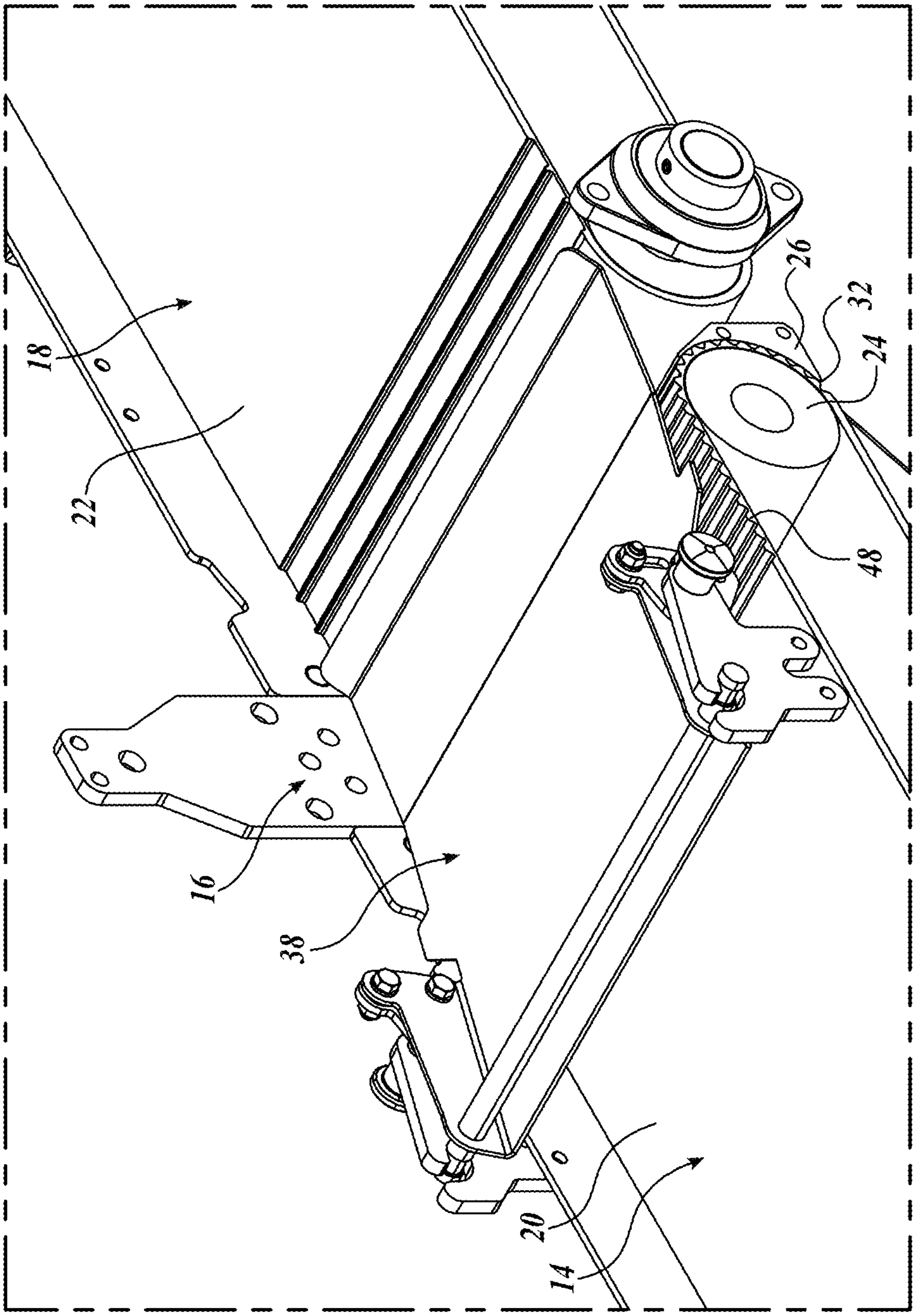
FIG. 2 is an isometric view of a skinning station of the exemplary automated skin removal machine of FIG. 1.
Figure 3:
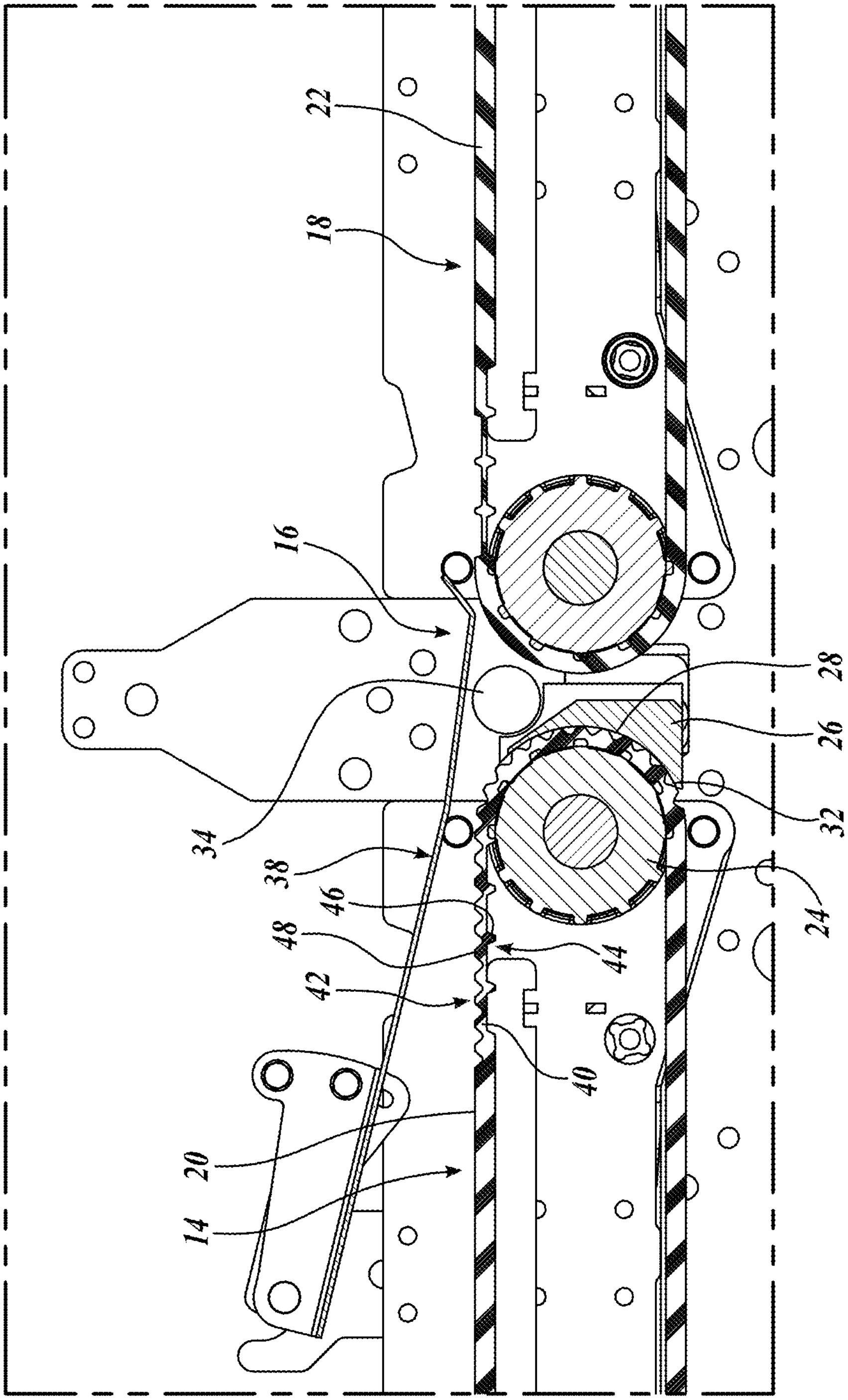
FIG. 3 is a cross-sectional view of the skinning station of the exemplary automated skin removal machine of FIG. 1.

FIGS. 1-3 depict an exemplary automated skin removal machine 10. The automated skin removal machine 10 is substantially the same as the machine shown and described in U.S. patent Ser. No. 11/559,059, entitled "Poultry Skinner," the entire contents of which are hereby expressly incorporated herein. In that regard, the automated skin removal machine 10 will only be briefly described.

In basic form, the automated skin removal machine 10 includes a frame 12 for supporting an infeed conveyor 14 for transporting and feeding poultry products (sometimes hereinafter simply called "poultry pieces") to be skinned from an inlet end to a skinning station 16 located closely adjacent a downstream end of the infeed conveyor 14. An outfeed conveyor 18 is also supported by the frame 12 to carry the skinned poultry pieces away from the skinning station 16 for further processing. The infeed conveyor 14 includes an infeed endless conveyor belt 20, and the outfeed conveyor 18 includes an outfeed conveyor endless belt 22.

The skinning station 16 is defined by the downstream end of the infeed conveyor 14 in combination with an arcuate pinch surface 28 of a pinch block 26. The infeed conveyor 14 transports a piece of poultry to a downstream end of the infeed conveyor 14, and as the piece of poultry passes over a powered transfer roller 34 in between the infeed conveyor 14 and an outfeed conveyor 18, the skin attached to the poultry is trapped between the arcuate pinch surface 28 and the outer end of the infeed conveyor 14. The skin is pulled from the piece of poultry as it continues to move toward the outfeed conveyor 18.

The infeed endless conveyor belt 20 is trained around an end roller 24 at the downstream end of the infeed conveyor 14. Pinch block 26 is configured with a concave, arcuate pinch surface 28 having a curvature closely following the curvature of the infeed endless conveyor belt 20 trained around the end roller 24. A narrow gap 32 is defined between the arcuate pinch surface 28 and the infeed endless conveyor belt 20 for trapping the skin. The poultry piece is arranged skin-down on the infeed endless conveyor belt 20 (i.e., with the skin against the outer surface of the belt) such that the skin of the poultry piece is captured in the gap 32. In other words, the skin gets trapped between the infeed endless conveyor belt 20 and the arcuate pinch surface 28. The trapped skin is pulled downwardly by the infeed endless conveyor belt 20 as the belt travels around the end roller 24. As a result, the infeed endless conveyor belt 20 pulls the skin downwardly away from the underlying flesh of the poultry piece.

A powered transfer roller 34, located between the adjacent ends of the infeed and outfeed conveyors 14 and 18, assists in transferring the skinned poultry piece to the outfeed conveyor. In addition, a hold down structure 38 is provided for applying downward pressure on the poultry piece as the poultry piece is carried by the infeed conveyor 14 towards the skinning station 16, while the poultry skin is being removed, and while the skinned poultry piece is being transferred from the infeed conveyor 14 to the outfeed conveyor 18. The transfer roller 34 together with the hold down structure 38 support the poultry piece as it moves laterally toward the outfeed conveyor 18, opposing the downward pulling forces of the skin as it is pulled downwardly by the infeed endless conveyor belt 20.

The infeed endless conveyor belt 20 may have a unique design, such as unique outer profile, for removing skin in a desired manner from a specific type or size of poultry. For instance, the infeed endless conveyor belt 20 may be designed to remove some, all, or just a portion of the fat together with the skin of the poultry piece. The infeed endless conveyor belt 20 may also or instead be designed to remove skin from a poultry piece of a certain size, such as a large bird, a small bird, or a medium bird and/or such as breast versus thigh. The infeed endless conveyor belt 20 may also or instead be designed to remove skin from a poultry piece of a certain type, such as chicken, duck, turkey, etc.

In some examples, the infeed endless conveyor belt 20 is a flexible belt with protrusions extending radially outwardly from a belt outer surface toward the arcuate pinch surface 28 as the belt travels around the end roller 24. In the example depicted in FIGS. 1-3, the outer profile of the infeed endless conveyor belt 20 may be configured substantially similarly to the belt shown and described in U.S. Provisional Pat. App. No. 63/505,334, entitled "Poultry Skinner Belt Profile", the entire contents of which are hereby expressly incorporated herein.

In the example shown, the infeed endless conveyor belt 20 is a monolithic form having a belt body 40 with an outer or exterior side 42 and an inner or interior side 44. The inner or interior side 44 includes a suitable profile having interior flights or interior protrusions 46 configured to engage a correspondingly shaped profile on an exterior surface of the end roller 24, such that the belt moves with the end roller 24 during rotation of the end roller.

The exterior side 42 of the infeed endless conveyor belt 20 includes a suitable profile for trapping skin between the belt and the arcuate pinch surface 28 of the pinch block 26 as the belt travels along the arcuate pinch surface. In general, the infeed endless conveyor belt 20 includes a plurality of flights or transverse exterior protrusions 48 defined on the exterior side 42 across its width that enable the belt to grip the exterior of the skin of the poultry piece being transported on the belt. Corresponding valleys 50 are defined on the exterior side 42 of the infeed endless conveyor belt 20 across its width between each of the plurality of transverse protrusions 48. The protrusions 48 enable the belt to capture and grip the skin while the skin is being pulled through the gap 32 between the belt and the arcuate pinch surface 28 of the pinch block 26. The spacing of the protrusions 48 and corresponding valleys 50 may be dictated by the species of poultry being skinned (e.g., chicken v. turkey v. duck, large bird v. medium bird v. small bird, etc.), the type of poultry piece being skinned (e.g., breast v. thigh), the level of skinning needed (skin with all fat removed, skin with some fat removed, skin with substantially no fat removed, etc.), and other factors.

Other suitable belt outer profiles may also be used, such as those shown and described in U.S. patent Ser. No. 10/617,126, entitled "Poultry Skinner With Belt," the entire content of which is hereby expressly incorporated herein, and U.S. patent Ser. No. 11/559,059, incorporated herein. For instance, the infeed endless conveyor belt 20 may instead include small, circularly shaped nubs that have a width (laterally across the conveyor belt) similar to their length (along the length of the conveyor belt in the direction of movement of the belt). In some examples, the protrusions may be a sharp or rounded tooth shape. In other examples, the protrusions may be rectangular or square. In other examples, outer profile is defined by transverse, rectangular, thin ribs.

The belt outer profile may be selected to suit the skinning needs of the poultry pieces. As can be appreciated, the length and thickness of each protrusion/nub/rib, the spacing between adjacent protrusions/nubs/ribs, their heights from a base of the outer surface of the belt, and other physical parameters defining the belt outer profile influence the skinning results of different poultry products.

For instance, the outer profile of the infeed endless conveyor belt 20 may be configured as shown in FIGS. 1-3 to remove skin from smaller pieces of poultry (e.g., pieces from smaller birds, wings v. breasts, etc.) without damaging the meat portion (e.g., without entrapping any part of the meat between the belt and the pinch block, without damaging the meat portion during conveyance, etc.) and while being able to leave a sufficient amount of fat attached to the meat portion (e.g., without pulling all the fat off along with the skin). In some examples, the spacing between adjacent protrusions 48 may be increased from that shown for skinning larger pieces of poultry, for removing more fat from the piece of poultry, etc.

In some examples, the infeed endless conveyor belt 20 may be of monolithic form (e.g., made of a single flexible sheet), as noted above. A monolithic belt may be made of a single, suitably flexible and durable material, such as a polymer (e.g., polyurethane, rubber, etc.). It can be appreciated that the material may be chosen depending on the skinning needs. Specifically, the durometer and frictional resistance to sliding movement (against the arcuate pinch surface 28) of a polymer belt influence the skinning results, and these parameters may be modified to affect skinning performance. A monolithic belt may injection molded or made in any suitable manner.

In other examples, the infeed endless conveyor belt 20 may be a modular belt made of multiple connected components. For instance, the infeed endless conveyor belt 20 may be made of numerous laterally-extending, longitudinally-aligned, sinusoidally-shaped, relatively rigid modules that interlace with next adjacent modules, such as that shown in U.S. patent Ser. No. 10/617,126, incorporated herein. These relatively rigid modules are hingedly mounted to each adjacent module so that the modules form a combination that has the effective flexibility, due to the hinges, needed to extend around the end roller 24.

The type of belt (e.g., monolithic v. modular), design of the belt (e.g., outer surface profile), and other parameters may determine which belt is chosen for an intended processing application on a machine, such as a poultry skinner. The chosen belt may also depend on the wear of the belt. As discussed above, the chosen conveyor belt must be in sufficiently good condition to carry out the intended processing task. As a belt is used, an outer and/or inner surface of the belt, including any protrusions, can become worn and may no longer be suitable for carrying out the task. In other words, a height of the protrusions extending from a base of the outer surface can decrease as a belt is used, which affects the skinning gap defined between the belt and the arcuate pinch surface 28.

A conveyor belt management system 102 suitable for tracking and managing one or more physical parameters of a conveyor belt, such as its type, wear, etc., will now be described with reference to FIGS. 4-6. The conveyor belt management system 102 may be used to optimize conveyor belt use for a machine(s), such as a poultry skinner as described herein. However, as noted above, the conveyor belt management system 102 may be adapted for use with any machine that uses conveyor belts.

Moreover, the conveyor belt management system 102, though sometimes described with specific applicability to food products or food items, such as poultry pieces, may also be used outside of the food area. Accordingly, it is to be understood that references to "food", "food products", "food pieces", "food items", "pieces", "portions", "poultry pieces", "poultry", etc., also include non-food items such as "workpieces," "products", "components", "samples", etc.

Figure 4:
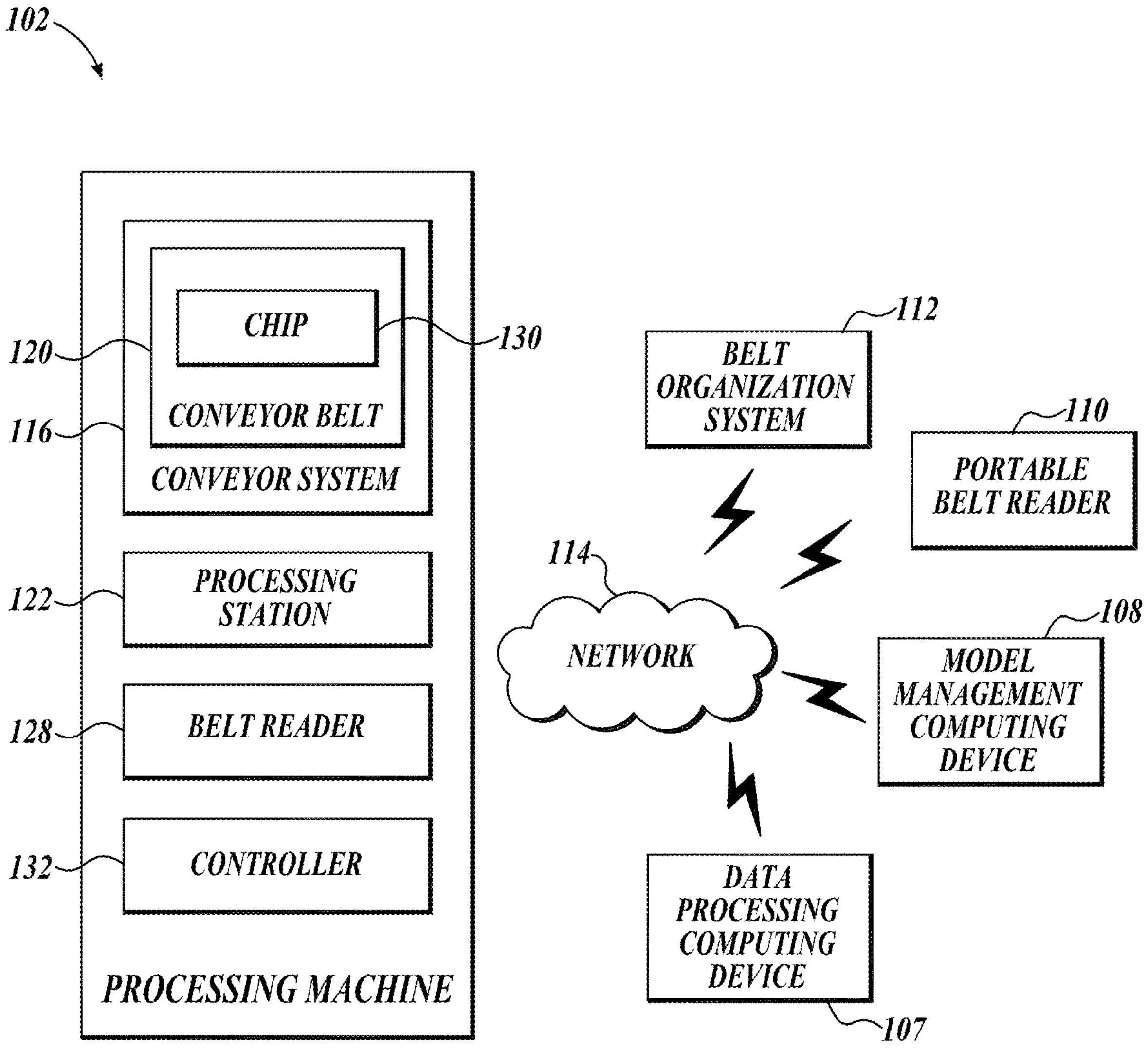
FIG. 4 is a block diagram of a non-limiting example of a conveyor belt management system.
Figure 5:
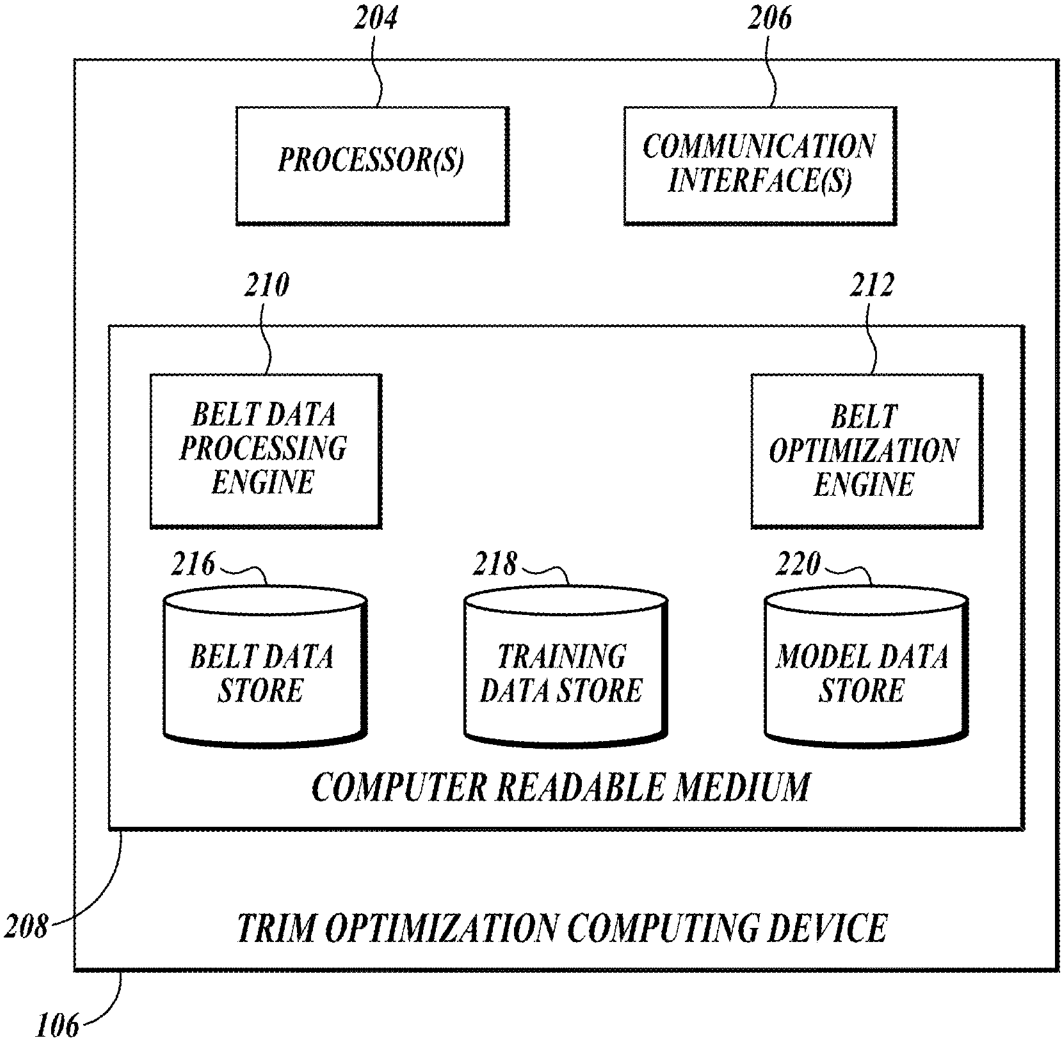
FIG. 5 is a block diagram of a non-limiting example of a belt management computing device for use in the conveyor belt management system.

FIG. 4 depicts a block diagram of a non-limiting example of a conveyor belt management system 102. The conveyor belt management system 102 may include various components and networked computing devices configured for managing aspects of conveyor belt use, such as a workpiece processing machine 104, a belt management computing device 106, a model management computing device 108, a portable belt reader 110, and a belt organization system 112 communicatively coupled together through a network 114. The network 114 can be any kind of network capable of enabling communication between the various components of the conveyor belt management system 102. For example, the network can be a WiFi network.

A general overview of the components of the conveyor belt management system 102 will first be provided. As noted above, the conveyor belt management system 102 is generally configured to carry out and manage aspects of conveyor belt use, including tracking and managing one or more physical parameters of a conveyor belt, such as its type, wear, etc.

The workpiece processing machine 104 of the conveyor belt management system 102 may be generally configured to carry out workpiece processing steps, such as skinning a poultry piece. The workpiece processing machine 104 may also be configured to capture data regarding the conveyor belt, such as type or wear data. The belt management computing device 106 may be generally configured to manage aspects of conveyor belt use, including tracking and managing one or more physical parameters of a conveyor belt, such as its type, wear, etc. The model management computing device 108 may be generally configured to train one or more machine learning models for use in the conveyor belt management system 102. The portable belt reader 110 may be configured to capture data regarding the conveyor belt, such as type or wear data, such as when the conveyor belt is not installed on the workpiece processing machine 104. The belt organization system 112 may be used to store and organize conveyor belts, such as according to type or wear, for use on the workpiece processing machine 104 or other similar machines.

It should be appreciated that any of the techniques described herein may be carried out by any suitable computing device(s) and should not be limited to the specific configurations provided herein. For instance, some or all of the techniques described herein may be carried out by the belt management computing device 106 or another computing device. Thus, the examples and techniques discussed herein should not be seen as limiting.

Detailed exemplary aspects of the workpiece processing machine 104 will now be described. The workpiece processing machine 104 is generally configured to carry out processing of workpieces with a certain type of conveyor belt. Any suitable assemblies and components, including the arrangement of assemblies and components, may be used. For instance, the workpiece processing machine 104 may be substantially similar to the automated skin removal machine 10 shown and described herein, as well as in U.S. patent Ser. No. 11/559,059, incorporated herein.

In the depicted exemplary block diagram of FIG. 4, the workpiece processing machine 104 includes a conveyor system 116 having an endless conveyor belt 120, a processing station 122, and a belt information system including a belt reader 128 and a data storage device associated with the endless conveyor belt 120, such as a chip 130. The various components of the workpiece processing machine 104 may be controlled by a controller 132.

The conveyor system 116 includes an endless conveyor belt 120 and suitable structure for moving the belt within the workpiece processing machine 104. The endless conveyor belt 120 may be any suitable design for the intended processing application, such as a monolithic, endless configuration having outer protrusions, a modular endless belt, etc. For instance, the endless conveyor belt 120 may include one or more of the features described herein.

The endless conveyor belt 120 includes a data storage device or chip 130 that is configured to support identification of and tracking of the endless conveyor belt 120. For instance, the chip 130 may be an RFID tag configured to store numeric or binary data related to the belt identification, use, and/or wear. The chip 130 may be readable and writable by the belt reader 128, which may be a suitable sensor device, such as an RFID reader.

The chip 130 may be secured to or within the endless conveyor belt 120 in any suitable manner such that it is readable and writable by the belt reader 128 at predefined intervals, such as once per belt revolution. In the case of a monolithic, molded belt, the chip 130 may be integrated or embedded within the body of the endless conveyor belt 120 during the molding process. In the case of a modular belt, the chip 130 may be secured to one of the multiple connected components. In any event, the chip 130 may be located on the endless conveyor belt 120 such that it is within proximity to the belt reader 128 for reading/writing to the chip at the predefined intervals. In some examples, the belt reader 128 may be positioned on the frame of the workpiece processing machine 104 (e.g., see frame 12), such as near a lateral side of the belt 120. In that regard, the chip 130 may be located near the lateral side of the belt 120 near the belt reader 128.

In any event, the belt reader 128 may include suitable processing capabilities to read information stored on the chip 130, such as information that identifies the type of belt (e.g., monolithic v. modular, belt outer surface profile, manufacturer, machine compatibility, workpiece compatibility, etc.), the belt usage or wear (e.g., the number of processing revolutions), or other data. The belt information may be sent from the belt reader 128 to the controller 132 or another computing device for managing or tracking aspects of workpiece processing and/or belt use. For instance, the belt information may be sent to the belt management computing device 106 for processing.

The belt reader 128 may also include suitable processing capabilities for writing information to the chip 130 for managing or tracking aspects of workpiece processing and/or belt use. For instance, the belt reader 128 may output a signal(s) to the chip 130 each time the endless conveyor belt 120 completes a revolution and the chip is read by the reader. The signal(s) sent from the belt reader 128 to the chip 130 may be indicative of the "belt count", or the cumulative number of belt revolutions. In that regard, the belt reader 128 may read a belt count from the chip 130 and may write or output a signal to the chip to index the belt count. The output signals of the belt reader 128 may be in numeric format, binary format, or another suitable format.

In some examples, the conveyor belt management system 102 includes a portable belt reader 110, as noted above. The portable belt reader 110 may be configured to read and write information to the chip 130, regardless of whether the endless conveyor belt 120 is installed on the machine. For instance, the portable belt reader 110 may be used to check type and/or wear data of belts that are not in use (e.g., belts that are being stored in a closet or in a storage portion of the belt organization system 112). The portable belt reader 110 may have the same or similar processing capabilities as the belt reader 128 described above, with the ability to communicate wirelessly with other components of the conveyor belt management system 102, such as the belt management computing device 106.

The processing station 122 may include one or more processing components for carrying out processing tasks related to or affected by conveyance of the workpieces by the endless conveyor belt 120. For instance, the processing station 122 may include the skinning station 16 as described above. As can be appreciated, if the processing station 122 is a skinning station or the like, the processing efficiency and quality can be highly effected by belt type, wear, etc.

The controller 132 may be used to control one or more components of the processing station 122 and the conveyor system 116. For instance, the controller 132 may be used to control a speed of the endless conveyor belt 120 based on predetermined criteria or requirements for the workpiece processing (e.g., a workpiece recipe). The conveyor belt speed may depend on the type of belt, the wear of the belt, the workpiece processing needs (e.g., type and/or size of a poultry piece to be skinned, amount of fat to be removed, etc.), or other factors. If the processing station 122 is a skinning station, the controller 132 may be used to control the speed of the endless conveyor belt 120 to effectively remove skin from a poultry piece with an appropriate amount of fat and without damaging the piece. The controller 132 may output signals to the processing machine components to carry out instructions sent from one or more other computing devices, such as the belt management computing device 106.

Referring to the block diagram shown in FIG. 5, exemplary aspects of the belt management computing device 106 will now be described. In the exemplary block diagram of FIG. 5, the belt management computing device 106 includes a processor(s) 204, a communication interface(s) 206, computer readable medium 208, and at least one data store (e.g., belt data store 216, training data store 218, and model data store 220). As shown, the computer readable medium 208 has stored thereon logic that, in response to execution by the one or more processor(s) 204, cause the belt management computing device 106 to provide a belt data processing engine 210, and a belt optimization engine 212.

The belt management computing device 106 may be implemented by any computing device or collection of computing devices, including but not limited to a desktop computing device, a laptop computing device, a mobile computing device, an edge computing device, a server computing device, a computing device of a cloud computing system, and/or combinations thereof. In some examples, the processor(s) 204 may include any suitable type of general-purpose computer processor. In some examples, the processor(s) 204 may include one or more special-purpose computer processors or AI accelerators optimized for specific computing tasks, including but not limited to graphical processing units (GPUs), vision processing units (VPTs), and tensor processing units (TPUs).

In some examples, the communication interface(s) 206 includes one or more hardware and or software interfaces suitable for providing communication links between components. The communication interface(s) 206 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

As used herein, "engine" refers to logic embodied in hardware or software instructions, which can be written in one or more programming languages, including but not limited to C, C++, C#, COBOL, JAVA™, PHP, Perl, HTML, CSS, Javascript, VBScript, ASPX, Go, and Python. An engine may be compiled into executable programs or written in interpreted programming languages. Software engines may be callable from other engines or from themselves. Generally, the engines described herein refer to logical modules that can be merged with other engines or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

The belt data processing engine 210 of the belt management computing device 106 may be configured to pre-process incoming data for a conveyor belt and any related data. The data may include belt identification information (e.g., monolithic v. modular, belt outer surface profile, manufacturer, machine compatibility, workpiece compatibility, etc.) and belt usage data (e.g., belt count or cumulative number of processing revolutions), such as data retrieved from or sent from the belt reader 128 and/or the portable belt reader 110. The related data may include data pertaining to the workpieces to be processed, such as the type or size of the workpieces. Pre-processing of the data may include extracting relevant information, correlating information, compressing data size, scrubbing the data, etc. Such pre-processed data may be stored in the belt data store 216 for later retrieval.

The data received and pre-processed by the belt data processing engine 210 may be sent to or retrieved by the belt optimization engine 212, which may use the data to determine any belt management recommendations or instructions. The belt management recommendations or instructions may relate to use of a certain belt, replacement of a belt, verification of a belt on the workpiece processing machine 104, adjustments to components or settings of the workpiece processing machine 104, etc. The belt optimization engine 212 may output instructions to the controller 132 of the workpiece processing machine 104 for automatically or semi-automatically carrying out an action according to the instructions, and/or the belt optimization engine 212 may output a recommendation on a display associated with the belt management computing device 106 and/or the workpiece processing machine 104 such that an operator may carry out any necessary actions.

In some examples, the belt management recommendations or instructions may include a recommendation to use a first belt of a first type (e.g., having a first belt outer surface profile and/or a first wear level (e.g., belt count)) to process workpieces of a first type. As can be appreciated, the belt type (monolithic v. modular, outer surface profile, etc.) and the belt usage or wear level can substantially affect the efficiency and quality of workpiece processing.

In the case of poultry skinning, certain belt outer surface profiles are used to skin poultry pieces of different sizes and/or to remove the skin with a desired amount of fat. The belt optimization engine 212 may output a recommendation to use a belt of a certain outer surface profile to skin the selected type or size of poultry pieces (e.g., based on operator input, workpiece imaging, etc.). For instance, the belt optimization engine 212 may output a recommendation to use the infeed endless conveyor belt 20 shown in FIGS. 1-3 to remove skin from smaller pieces of poultry (e.g., pieces from smaller birds, wings v. breasts, etc.) while leaving enough fat attached to the meat portion. In some examples, the belt optimization engine 212 may output a recommendation to use a belt that is a modified version of the infeed endless conveyor belt 20 shown in FIGS. 1-3 (e.g., increased spacing between adjacent protrusions 48) to remove skin from larger pieces of poultry, for removing more fat from the pieces of poultry, etc.

The belt optimization engine 212 may output a recommendation to use a belt of a certain wear or usage level to skin the selected type or size of poultry pieces (e.g., based on operator input, workpiece imaging, etc.). If outer protrusions of a belt are worn, the gap between the outer surface and protrusions of the belt and the arcuate pinch surface 28 will increase. Accordingly, the worn belt may be more appropriate for skinning poultry pieces of a different type or poultry pieces requiring a different level of fat removal. For instance, a belt having an outer contour like the infeed endless conveyor belt 20 shown in FIGS. 1-3 that is near the end of its life cycle (higher wear level) may be appropriate for skinning smaller poultry pieces with a high level of fat removal and/or larger smaller poultry pieces with a small to medium level of fat removal. Thus, the recommendation of the belt optimization engine 212 may tailor a wear or usage level of a belt to a specific processing application.

In some examples, the belt optimization engine 212 may execute one or more belt optimization machine learning models suitable for outputting a belt optimization plan. The belt optimization plan may include recommendations or instructions to use a belt of a certain wear or usage level to process a selected workpiece(s). In that regard, input for the belt optimization machine learning model(s) may include at least one of belt identification information (e.g., monolithic v. modular, outer surface profile, manufacturer, machine compatibility, workpiece compatibility, etc.), belt usage data (e.g., belt count or cumulative number of processing revolutions), and workpiece processing needs (e.g., type and/or size of a poultry piece to be skinned, amount of fat to be removed, etc.). The belt optimization machine learning model(s) may be trained by the model management computing device 108 using historical data of belts chosen for certain workpiece processing needs, data generated by manually matching belt information with workpiece processing needs, etc.

In some examples, the belt optimization engine 212 may output recommendations or instructions to replace a belt within a certain number of uses or counts and/or recommendations or instructions for ordering a replacement belt. At some point, a belt may become so worn that it is no longer adequate to support workpiece processing, such as skinning. The threshold usage level or belt count may be determined by calculating belt counts of belts previously used on the workpiece processing machine 104. If the belt is an endless, continuous loop belt with a known length or circumference, the belt count for a worn belt can be determined over its lifetime of use.

In that regard, the belt optimization engine 212 may, based on known usage data for a certain type of belt, output recommendations or instructions to replace a belt within a certain number of belt counts. For instance, the belt optimization engine 212 may output information indicating that the belt count is at 18,000 counts and that it should be replaced by count 20,000. The information may be displayed on a display associated with the belt management computing device 106 and/or the workpiece processing machine 104.

In some examples, the belt optimization engine 212 may output recommendations or instructions for ordering a replacement belt. For instance, the belt optimization engine 212 may output information regarding a part number for ordering a replacement belt. In some examples, the belt optimization engine 212 may automatically order a replacement belt, such as by sending an electronic order to a digital order platform of the belt supplier or manufacturer. In some examples, the belt optimization engine 212 may determine an optimal time for ordering two or more replacement belts (e.g., a bulk order) based on wear data and expected usage for the two or more belts. For instance, if a first belt is 60% worn and a second belt is 80% worn but used less frequently than the first belt, the belt optimization engine 212 may place a replacement order for both belts when the first belt is 80% used.

In some examples, the belt optimization engine 212 may execute one or more belt optimization machine learning models suitable for outputting a belt optimization plan regarding belt replacement. The belt optimization plan may include recommendations or instructions to replace a belt of a certain wear or usage level. In that regard, input for the belt optimization machine learning model(s) may include at least one of belt identification information (e.g., monolithic v. modular, belt outer surface profile, manufacturer, machine compatibility, workpiece compatibility, etc.), belt usage data (e.g., belt count or cumulative number of processing revolutions), and workpiece processing needs (e.g., type and/or size of a poultry piece to be skinned, amount of fat to be removed, etc.). The belt optimization machine learning model(s) may be trained using historical or generated data of belt replacement schedules correlated to belt identification information, usage data, workpiece processing needs, etc.

In some examples, the belt optimization engine 212 may output information regarding verification of a belt on the workpiece processing machine 104. For instance, the belt optimization engine 212 may output information regarding whether the correct style or type of belt was chosen for the workpiece processing and/or whether the correct belt age was chosen. For instance, if an operator selected a recipe for skinning small chicken thighs, the belt optimization engine 212 may output information indicating whether the correct belt was chosen, e.g., whether the belt has a necessary belt outer surface profile, whether the belt is from a selected manufacturer, whether the belt is above or below a certain usage level, etc. If the installed belt does not support the workpiece processing recipe, the belt optimization engine 212 may output information indicating such.

In some examples, if the installed belt does not support the workpiece processing recipe, the belt optimization engine 212 may output instructions to the controller 132 of the workpiece processing machine 104 to cause one or more components of the workpiece processing machine 104 to cease functioning, to function in a different manner, etc. For instance, the belt optimization engine 212 may output instructions to the controller 132 to cause the workpiece processing machine 104 to stop running the conveyor system 116 and the processing station 122, to run the conveyor system 116 and the processing station 122 at a slower or suboptimal speed or rate, etc., if an incorrect belt is used.

In some examples, the belt optimization engine 212 may output processing machine diagnostic information based on information received from the belt data processing engine 210. If the conveyor belt is an endless, continuous loop belt with a known length or circumference, as with most skinners, the belt data processing engine 210 should receive belt count data from the belt reader 128 at known time increments when running a drive system (e.g., a VFD) of the conveyor system 116 at a designated speed. For instance, the belt reader 128 should read the chip 130 on the endless conveyor belt 120 so many times per minute. If the belt reader 128 does not receive the expected belt count data for a certain period, the belt optimization engine 212 may output information indicative of the poor machine performance. In some examples, the belt optimization engine 212 may output instructions to the controller 132 to turn off the workpiece processing machine 104 if the belt count is off.

In some examples, the belt optimization engine 212 may output belt management recommendations or instructions for adjusting components or settings of the workpiece processing machine 104 to accommodate belts of different configurations or wear. For instance, with a skinner, the location of the pinch block relative to the downstream end of the infeed conveyor belt dictates the gap between the outer protrusions of the belt and the arcuate pinch surface. If the outer protrusions of the belt become worn, the gap will increase. Thus, the belt optimization engine 212 may output instructions for adjusting the location of the pinch block relative to the conveyor to decrease or increase the gap for effectively skinning.

In some examples, the belt optimization engine 212 may execute one or more belt optimization machine learning models suitable for outputting a belt optimization plan that includes recommendations or instructions to adjusting components or settings of the workpiece processing machine 104 to use a belt of a certain wear or usage level to process a selected workpiece(s). In that regard, input for the belt optimization machine learning model(s) may include at least one of belt identification information (e.g., monolithic v. modular, belt outer surface profile, manufacturer, machine compatibility, workpiece compatibility, etc.), belt usage data (e.g., belt count or cumulative number of processing revolutions), workpiece processing needs (e.g., type and/or size of a poultry piece to be skinned, amount of fat to be removed, etc.), and machine settings. The belt optimization machine learning model(s) may be trained by the model management computing device 108, for example, using historical data of initial and corrected settings used for processing certain workpieces with certain belt specifications.

Any relevant training data for the belt optimization machine learning model(s) generated by the belt management computing device 106 may be stored in the training data store 218 of the belt management computing device 106 and/or a training data store of the model management computing device 108. After being trained at least initially, the belt optimization machine learning model(s) may be stored on the model management computing device 108 and retrieved by the belt optimization engine 212 for execution, and/or the belt optimization machine learning model(s) may be stored locally on the belt management computing device 106. To support processing of the machine learning models, the belt management computing device 106 may be configured as a local, high power or edge computing device (e.g., like the data processing computing device described in U.S. Provisional Patent No. 63/588,917).

The model management computing device 108 may also receive or request data regarding workpiece processing machine settings (e.g., from the controller 132), such as the settings of the conveyor system 116 and/or the processing station 122. The machine settings, including an initial setting and any adjusted or corrected settings corresponding to information in belt data and/or workpiece processing data or requirements, may be used to train one or more machine learning models to generate a belt optimization plan.

In some examples, the belt optimization machine learning model(s) may be trained using belt optimization score(s). For instance, belt optimization score(s) may be correlated to belt type and/or wear, incoming workpiece specifications (e.g., type, thickness, size, etc.), finished workpiece specifications (percentage within spec, yield data, etc.), conveyor system 116 initial and adjusted settings, processing station 122 initial and adjusted settings, etc. For instance, if, based on a first belt optimization score for workpieces having first specifications, a belt is changed and/or settings for a skinning station of a skinner are adjusted to generate a different skinning result, the skinner station adjustments can be correlated to the belt optimization score(s) for a specific belt/skinner configuration.

The component or machine setting adjustment data may be derived from operator input in response to a belt optimization score output and/or a belt optimization plan output from a machine learning model correlated to a score. For example, if an operator receives a belt optimization plan including a recommendation for belt, component, and/or machine setting adjustments (optionally with a score), the operator may accept the recommendation, reject the recommendation, and/or make manual adjustments based on the recommendation. The operator's input can be part of the training data.

Any suitable type of artificial intelligence may be used, including machine learning models that incorporate convolutional neural networks and/or computer vision and/or image segmentation, optionally incorporating deep learning techniques. In one example, the belt optimization plan machine learning model may be able to identify separate workpieces on the conveyor system 116 (e.g., using optical sca data) by segmenting or "cutting out" an object, feature, etc., in an image. The belt optimization plan machine learning model may incorporate the Segment Anything Model (SAM) available from Meta AI, FastSAM from Ultralytics, or another suitable image segmentation model using image segmentation techniques.

Any suitable technique may be used to train the machine learning models, including but not limited to one or more of gradient descent, data augmentation, hyperparameter tuning, and freezing/unfreezing of model architecture layers. In some examples, annotated, raw images are used as the training input. In some examples, one or more features derived from the images, including but not limited to versions of the images in a transformed color space, set of edges detected in the image, one or more statistical calculations regarding the overall content of the images, or other features derived from the images may be used instead of or in addition to the annotated raw images to train the machine learning models.

As noted above, the conveyor belt management system 102 may, in some examples, include a belt organization system 112. The belt organization system 112 may be configured to store unused belts in an organized manner, such as to support easy access to belt identification and/or wear data, to assemble the belts according to identification and/or wear data, etc. In one non-limiting example, each belt may be positionable in a storage location near a chip reader that can display information related to the belt, such as identification and/or wear data. In such a system, an operator can quickly and easily identify the recommended belt for use in the workpiece processing machine 104. As noted above, a portable belt reader 110 may also or instead be used to gain quick access to the belt information.

Figure 6:
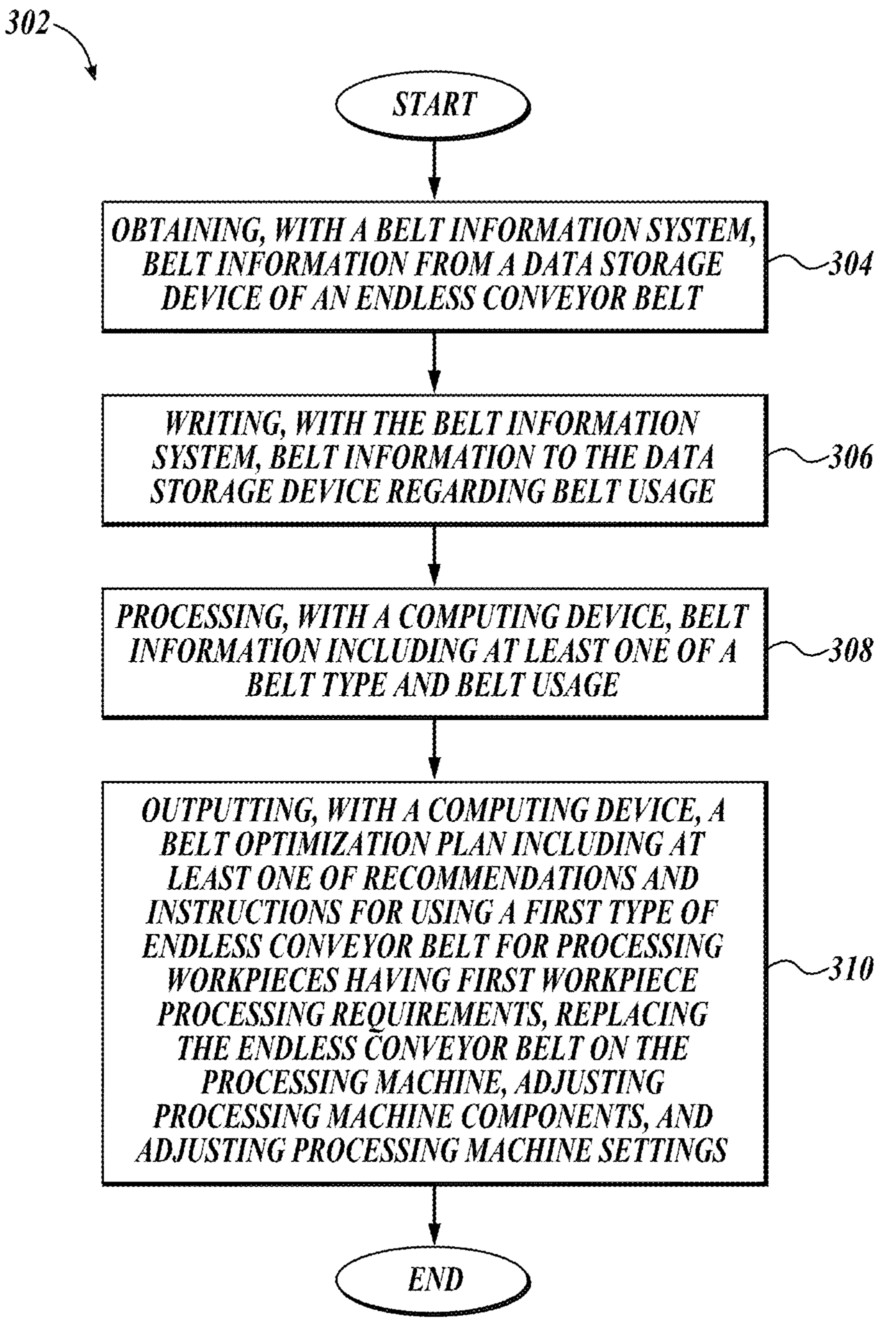
FIG. 6 is a flowchart of a non-limiting example of a method of managing conveyor belts for a processing machine.

FIG. 6 is a flowchart of a non-limiting example of a method 302 of managing conveyor belts for a processing machine. The method 302 may be carried out using any components described herein with reference to the conveyor belt management system 102, or any other suitable components. Moreover, aspects of the method 302 may be carried out by the controller 132, the belt management computing device 106, the model management computing device 108, and/or any other suitable computing device.

From a start block, the method 302 may proceed to block 304, which includes obtaining, with a belt information system, belt information from a data storage device of an endless conveyor belt. The belt information may include whether the endless conveyor belt is one of monolithic and modular, a belt outer surface profile, a manufacturer source, machine compatibility, workpiece compatibility, and a belt count.

The method 302 may proceed to block 306, which includes writing, with the belt information system, belt information to the data storage device regarding belt usage.

In some aspects, the method includes reading, with an RFID reader (e.g., belt reader 28 or portable belt reader 110), an RFID tag (e.g., chip 130) secured within the endless conveyor belt each time the endless conveyor belt completes a cycle in the workpiece processing machine, and writing, with the RFID reader, belt usage information pertaining to the endless conveyor belt to the RFID tag each time the endless conveyor belt completes a cycle in the workpiece processing machine. For instance, the RFID reader may index the belt count every time the RFID tag is read.

The method 302 may proceed to block 308, which includes processing, with a computing device, belt information including at least one of a belt type and belt usage. For instance, the information may be pre-processed by the belt data processing engine 210 of the belt management computing device 106 for sending to the belt optimization engine 212.

The method 302 may proceed to block 310, which includes outputting, with a computing device (e.g., the belt optimization engine 212 of the belt management computing device 106), a belt optimization plan including at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings. The method 302 may further include executing, with a computing device (e.g., the belt optimization engine 212 of the belt management computing device 106), one or more belt optimization machine learning models to output the belt optimization plan using at least one of belt identification information, belt usage data, and workpiece processing needs as input.

The belt optimization plan may include at least one of information regarding whether a belt outer surface profile and a belt wear level is suitable for carrying out processing of workpieces having the first workpiece processing requirements. The belt optimization plan may include a recommendation to use a first endless conveyor belt having a first outer surface profile and a first wear level to process workpieces of a first type, and a recommendation to use a second endless conveyor belt having a second outer surface profile and the first wear level to process workpieces of a second type. In the case of poultry skinning, certain belt outer surface profiles are used to skin poultry pieces of different sizes and/or to remove the skin with a desired amount of fat. The belt optimization engine 212 may output a recommendation to use a belt of a certain outer surface profile to skin the selected type or size of poultry pieces (e.g., based on operator input, workpiece imaging, etc.). For instance, the belt optimization engine 212 may output a recommendation to use the infeed endless conveyor belt 20 shown in FIGS. 1-3 to remove skin from smaller pieces of poultry (e.g., pieces from smaller birds, wings v. breasts, etc.) while leaving enough fat attached to the meat portion.

The belt optimization engine 212 may output a recommendation to use a belt of a certain wear or usage level to skin the selected type or size of poultry pieces (e.g., based on operator input, workpiece imaging, etc.). If outer protrusions of a belt are worn, the gap between the outer surface and protrusions of the belt and the arcuate pinch surface 28 will increase. Accordingly, the worn belt may be more appropriate for skinning poultry pieces of a different type or poultry pieces requiring a different level of fat removal. For instance, a belt having an outer contour like the infeed endless conveyor belt 20 shown in FIGS. 1-3 that is near the end of its life cycle (higher wear level) may be appropriate for skinning smaller poultry pieces with a high level of fat removal and/or larger smaller poultry pieces with a small to medium level of fat removal. Thus, the recommendation of the belt optimization engine 212 may tailor a wear or usage level of a belt to a specific processing application.

The belt optimization plan may include at least one of information regarding a part number for ordering a replacement endless conveyor belt and instructions for sending to a computing device to automatically order a replacement endless conveyor belt. For instance, the belt optimization engine 212 may output information regarding a part number for ordering a replacement belt. In some examples, the belt optimization engine 212 may automatically order a replacement belt, such as by sending an electronic order to a digital order platform of the belt supplier or manufacturer. In some examples, the belt optimization engine 212 may determine an optimal time for ordering two or more replacement belts (e.g., a bulk order) based on wear data and expected usage for the two or more belts. For instance, if a first belt is 60% worn and a second belt is 80% worn but used less frequently than the first belt, the belt optimization engine 212 may place a replacement order for both belts when the first belt is 80% used.

The method 302 may further include outputting, with a computing device (e.g., the belt optimization engine 212 of the belt management computing device 106), at least one of recommendations or instructions for adjusting at least one of components and settings of the processing machine to accommodate the belt outer surface profile and the belt wear level. For instance, with a skinner, the location of the pinch block relative to the downstream end of the infeed conveyor belt dictates the gap between the outer protrusions of the belt and the arcuate pinch surface. If the outer protrusions of the belt become worn, the gap will increase. Thus, the belt optimization engine 212 may output instructions for adjusting the location of the pinch block relative to the conveyor to decrease or increase the gap for effectively skinning. The method 302 may further include executing, with a computing device (e.g., the belt optimization engine 212 of the belt management computing device 106), one or more belt optimization machine learning models to output at least one of recommendations or instructions for adjusting at least one of components and settings of the processing machine using the belt outer surface profile and the belt wear level as input.

The method 302 may further include determining, with a computing device (e.g., the belt optimization engine 212 of the belt management computing device 106), if a belt count is less than an expected belt count for a certain period, and outputting, with a computing device (e.g., the belt optimization engine 212 of the belt management computing device 106), instructions to a controller of the processing machine to at least one of adjust a speed of the conveyor belt and stop the conveyor belt if the belt count is less than an expected belt count for a certain period.

The method 302 may further include executing, with a computing device (e.g., the belt optimization engine 212 of the belt management computing device 106), one or more belt optimization machine learning models to output instructions to a controller of the processing machine to at least one of adjust a speed of the conveyor belt and stop the conveyor belt using an actual belt count and an expected belt count for a certain period as input.

Figure 7:
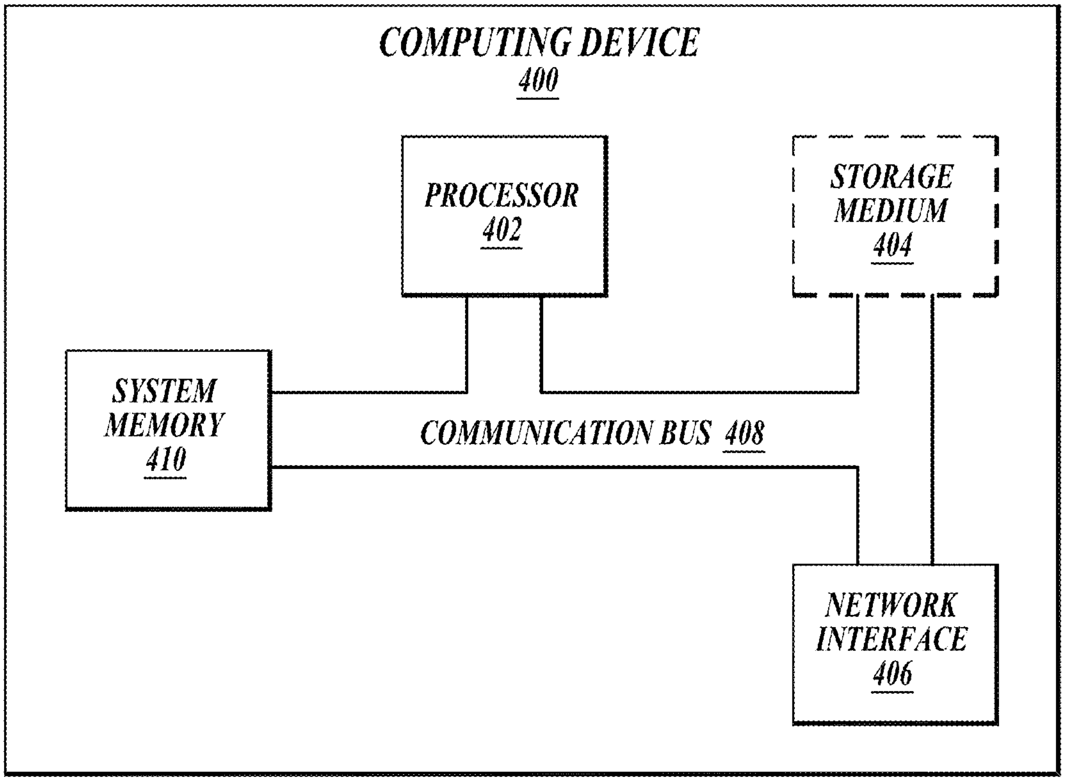
FIG. 7 is a block diagram that illustrates a non-limiting example of a computing device appropriate for use as a computing device with examples of the present disclosure.

FIG. 7 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 7 is described with reference to a computing device that is implemented as a device on a network, the description below is applicable to servers, personal computers, mobile phones, smart phones, tablet computers, embedded computing devices, and other devices that may be used to implement portions of examples of the present disclosure. Some examples of a computing device may be implemented in or may include an application-specific integrated circuit (ASIC), a field-programmable gate array (FPGA), or other customized device. Moreover, those of ordinary skill in the art and others will recognize that the computing device 400 may be any one of any number of currently available or yet to be developed devices.

In its most basic configuration, the computing device 400 includes at least one processor 402 and a system memory 410 connected by a communication bus 408. Depending on the exact configuration and type of device, the system memory 410 may be volatile or nonvolatile memory, such as read only memory ("ROM"), random access memory ("RAM"), EEPROM, flash memory, or similar memory technology. Those of ordinary skill in the art and others will recognize that system memory 410 typically stores data and/or program modules that are immediately accessible to and/or currently being operated on by the processor 402. In this regard, the processor 402 may serve as a computational center of the computing device 400 by supporting the execution of instructions.

As further illustrated in FIG. 7, the computing device 400 may include a network interface 406 comprising one or more components for communicating with other devices over a network. Examples of the present disclosure may access basic services that utilize the network interface 406 to perform communications using common network protocols. The network interface 406 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 406 illustrated in FIG. 7 may represent one or more wireless interfaces or physical communication interfaces described and illustrated above with respect to particular components of the computing device 400.

In the example depicted in FIG. 7, the computing device 400 also includes a storage medium 404. However, services may be accessed using a computing device that does not include means for persisting data to a local storage medium. Therefore, the storage medium 404 depicted in FIG. 7 is represented with a dashed line to indicate that the storage medium 404 is optional. In any event, the storage medium 404 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 402, system memory 410, communication bus 408, storage medium 404, and network interface 406 are known and commercially available. For ease of illustration and because it is not important for an understanding of the claimed subject matter, FIG. 7 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein While the concepts of the present disclosure are susceptible to various modifications and alternative forms, specific examples thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one example," "an example," "an exemplary example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "upstream", "downstream", "left", "right", "first", "second", etc., in the present disclosure is meant to provide orientation for the reader with reference to the drawings and is not intended to be the required orientation of the components or graphical images or to impart orientation limitations into the claims.

In the present disclosure the term "poultry piece" should be understood to include any piece of meat that may be skinned by the automated skin removal machine.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative FIG. Additionally, the inclusion of a structural or method feature in a particular FIG. is not meant to imply that such feature is required in all examples and, in some examples, it may not be included or may be combined with other features.

Methods according to the above-described examples can be implemented using computer-executable instructions that are stored or otherwise available from computer-readable media of a computing device in communication with the automated skin removal machine. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Systems implementing methods according to this disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example. The instructions, media for conveying such instructions, computing resources for executing them, and other structures for supporting such computing resources are means for providing the functions described in these disclosures.

Various examples of the disclosure are discussed in detail above. While specific implementations are discussed, it should be understood that this description is for illustration purposes only. A person skilled in the relevant art will recognize that other components and configurations may be used without parting from the spirit and scope of the disclosure. Thus, the description and drawings herein are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various examples given in this specification.

Without intent to limit the scope of the disclosure, examples of machines, components, methods and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. As used herein, the terms "about", "approximately," etc., in reference to a number, is used herein to include numbers that fall within a range of 10%, 5%, or 1% in either direction (greater than or less than) the number unless otherwise stated or otherwise evident from the context (except where such number would exceed 100% of a possible value).

While illustrative embodiments have been illustrated and described, it will be appreciated that various changes can be made therein without departing from the spirit and scope of the invention.

The invention claimed is:

1. A conveyor belt management system for managing conveyor belt use for a workpiece processing machine, comprising:
- a belt information system configured to obtain belt information from a data storage device of an endless conveyor belt and write belt information to the data storage device regarding belt usage;
- a processor; and
- a memory storing instructions that, when executed by the processor, cause a computing device of the conveyor belt management system to:
  - process belt information including at least one of an endless conveyor belt type and belt usage; and
  - output a belt optimization plan including at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

2. The conveyor belt management system of claim 1, wherein the belt information system comprises an RFID reader and an RFID tag secured within the endless conveyor belt, the RFID reader positioned relative to the workpiece processing machine to read the RFID tag secured within the endless conveyor belt each time the endless conveyor belt completes a cycle in the workpiece processing machine.

3. The conveyor belt management system of claim 1, wherein the belt information includes whether the endless conveyor belt is one of monolithic and modular, a belt outer surface profile of the endless conveyor belt, a manufacturer source, machine compatibility, workpiece compatibility, and a belt count.

4. The conveyor belt management system of claim 1, wherein the belt optimization plan includes a recommendation to use a first endless conveyor belt having a first outer surface profile and a first wear level to process workpieces of a first type, and wherein the belt optimization plan includes a recommendation to use a second endless conveyor belt having a second outer surface profile and the first wear level to process workpieces of a second type.

5. The conveyor belt management system of claim 1, wherein the belt optimization plan includes at least one of information regarding a part number for ordering a replacement endless conveyor belt and instructions for sending to a computing device to automatically order a replacement endless conveyor belt.

6. The conveyor belt management system of claim 1, wherein the belt optimization plan includes at least one of information regarding whether a belt outer surface profile and a belt wear level is suitable for carrying out processing of workpieces having the first workpiece processing requirements.

7. The conveyor belt management system of claim 6, wherein the memory storing instructions that, when executed by the processor, further cause a computing device of the conveyor belt management system to output at least one of recommendations or instructions for adjusting at least one of components and settings of the processing machine to accommodate the belt outer surface profile and the belt wear level.

8. The conveyor belt management system of claim 6, wherein the memory storing instructions that, when executed by the processor, further cause a computing device of the conveyor belt management system to execute one or more belt optimization machine learning models configured to output at least one of recommendations or instructions for adjusting at least one of components and settings of the processing machine using the belt outer surface profile and the belt wear level as input.

9. The conveyor belt management system of claim 6, wherein the belt outer surface profile includes outer protrusions extending from a base of an outer surface of the endless conveyor belt.

10. The conveyor belt management system of claim 9, wherein the belt wear level is defined by a height of the outer protrusions extending from the base of the outer surface of the endless conveyor belt.

11. The conveyor belt management system of claim 1, wherein the memory storing instructions that, when executed by the processor, further cause a computing device of the conveyor belt management system to:

determine if a belt count is less than an expected belt count for a certain period; and output instructions to a controller of the processing machine to at least one of adjust a speed of the endless conveyor belt and stop the conveyor endless conveyor belt if the belt count is less than an expected belt count for a certain period.

12. The conveyor belt management system of claim 1, wherein the memory storing instructions that, when executed by the processor, further cause a computing device of the conveyor belt management system to execute one or more belt optimization machine learning models configured to output instructions to a controller of the processing machine to at least one of adjust a speed of the endless conveyor belt and stop the endless conveyor belt using an actual belt count and an expected belt count for a certain period as input.

13. The conveyor belt management system of claim 1, wherein the memory storing instructions that, when executed by the processor, further cause a computing device of the conveyor belt management system to execute one or more belt optimization machine learning models to output the belt optimization plan using at least one of belt identification information, belt usage data, and workpiece processing needs as input.

14. A conveyor belt management system, comprising:

a workpiece processing machine, comprising:

a processing station for processing workpieces;

a conveyor system having an endless conveyor belt configured to support processing of the workpieces; and a belt information system configured for obtaining belt information from a data storage device of the endless conveyor belt and writing belt information to the data storage device regarding belt usage; and a processor; and a memory storing instructions that, when executed by the processor, cause a computing device of the conveyor belt management system to:

process belt information including at least one of a belt type and belt usage; and output a belt optimization plan including at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

15. A method for managing conveyor belts for a workpiece processing machine, comprising:

obtaining, with a belt information system, belt information from a data storage device of an endless conveyor belt;

writing, with the belt information system, belt information to the data storage device regarding belt usage;

processing, with a computing device, belt information including at least one of a belt type and belt usage; and outputting, with a computing device, a belt optimization plan including at least one of recommendations and instructions for using a first type of endless conveyor belt for processing workpieces having first workpiece processing requirements, replacing the endless conveyor belt, verifying the endless conveyor belt on the processing machine, adjusting processing machine components, and adjusting processing machine settings.

16. The method of claim 15, further comprising:

reading, with an RFID reader, an RFID tag secured within the endless conveyor belt each time the endless conveyor belt completes a cycle in the workpiece processing machine; and writing, with the RFID reader, belt usage information pertaining to the endless conveyor belt to the RFID tag each time the endless conveyor belt completes a cycle in the workpiece processing machine.

17. The method of claim 15, wherein the belt optimization plan includes a recommendation to use a first endless conveyor belt having a first outer surface profile and a first wear level to process workpieces of a first type, and wherein the belt optimization plan includes a recommendation to use a second endless conveyor belt having a second outer surface profile and the first wear level to process workpieces of a second type.

18. The method of claim 15, wherein the belt optimization plan includes at least one of information regarding whether a belt outer surface profile and a belt wear level is suitable for carrying out processing of workpieces having the first workpiece processing requirements.

19. The method of claim 18, further comprising outputting, with a computing device, at least one of recommendations or instructions for adjusting at least one of components and settings of the processing machine to accommodate the belt outer surface profile and the belt wear level.

20. The method of claim 18, further comprising executing, with a computing device, one or more belt optimization machine learning models to output at least one of recommendations or instructions for adjusting at least one of components and settings of the processing machine using the belt outer surface profile and the belt wear level as input.

* * * * *